US011411995B2

(12) United States Patent
Chopra et al.

(10) Patent No.: US 11,411,995 B2
(45) Date of Patent: *Aug. 9, 2022

(54) INFRASTRUCTURE LEVEL LAN SECURITY

(71) Applicant: Nicira, Inc., Palo Alto, CA (US)

(72) Inventors: Amit Chopra, Palo Alto, CA (US); Uday Masurekar, Sunnyvale, CA (US)

(73) Assignee: NICIRA, INC., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/945,909

(22) Filed: Aug. 2, 2020

(65) Prior Publication Data
US 2020/0366715 A1 Nov. 19, 2020

Related U.S. Application Data

(63) Continuation of application No. 14/965,870, filed on Dec. 10, 2015, now Pat. No. 10,771,505, which is a
(Continued)

(51) Int. Cl.
*H04L 29/06* (2006.01)
*H04L 9/40* (2022.01)

(52) U.S. Cl.
CPC ........ *H04L 63/162* (2013.01); *H04L 63/0272* (2013.01); *H04L 63/0457* (2013.01);
(Continued)

(58) Field of Classification Search
CPC ............... H04L 63/162; H04L 63/0272; H04L 63/0457; H04L 63/0485; H04L 63/061;
(Continued)

(56) References Cited

U.S. PATENT DOCUMENTS 6,061,349 A 5/2000 Coile et al.
6,101,543 A * 8/2000 Alden ................. H04L 63/0272
709/227
(Continued)

FOREIGN PATENT DOCUMENTS

CN 1783139 A 6/2006
CN 102122327 A 7/2011
(Continued)

OTHER PUBLICATIONS

Author Unknown, "Enabling Service Chaining on Cisco Nexus 1000V Series," Month Unknown, 2012, 25 pages, Cisco.
(Continued)

*Primary Examiner* — Darshan I Dhruv
(74) *Attorney, Agent, or Firm* — Adeli LLP

(57) ABSTRACT

Techniques are disclosed for securing traffic flowing across multi-tenant virtualized infrastructures using group key-based encryption. In one embodiment, an encryption module of a virtual machine (VM) host intercepts layer 2 (L2) frames sent via a virtual NIC (vNIC). The encryption module determines whether the vNIC is connected to a "secure wire," and invokes an API exposed by a key management module to encrypt the frames using a group key associated with the secure wire, if any. Encryption may be performed for all frames from the vNIC, or according to a policy. In one embodiment, the encryption module may be located at a layer farthest from the vNIC, and encryption may be transparent to both the VM and a virtual switch. Unauthorized network entities which lack the group key cannot decipher the data of encrypted frames, even if they gain access to such frames.

20 Claims, 6 Drawing Sheets

Related U.S. Application Data continuation of application No. 13/765,618, filed on Feb. 12, 2013, now Pat. No. 9,930,066.

(52) U.S. Cl.
CPC ........ *H04L 63/0485* (2013.01); *H04L 63/061* (2013.01); *H04L 63/065* (2013.01); *H04L 63/0876* (2013.01); *H04L 63/123* (2013.01)

(58) Field of Classification Search
CPC .. H04L 63/065; H04L 63/0876; H04L 63/123
See application file for complete search history.

(56) References Cited

U.S. PATENT DOCUMENTS

| | | | |
|---|---|---|---|
| 6,415,313 B1 | 7/2002 | Yamada et al. | |
| 6,751,729 B1 | 6/2004 | Giniger et al. | |
| 7,237,008 B1 | 6/2007 | Tarbotton et al. | |
| 7,254,835 B2 | 8/2007 | Pierre et al. | |
| 7,607,168 B1 | 10/2009 | Tripathi et al. | |
| 7,634,650 B1 * | 12/2009 | Shah | G06F 3/0662 |
| | | | 713/168 |
| 7,778,194 B1 | 8/2010 | Yung | |
| 7,818,452 B2 | 10/2010 | Matthews et al. | |
| 7,948,986 B1 | 5/2011 | Ghosh et al. | |
| 7,987,497 B1 | 7/2011 | Giles et al. | |
| 8,036,221 B2 | 10/2011 | Fluhrer et al. | |
| 8,190,767 B1 | 5/2012 | Maufer et al. | |
| 8,295,492 B2 | 10/2012 | Suarez et al. | |
| 8,307,359 B1 | 11/2012 | Brown et al. | |
| 8,321,925 B1 | 11/2012 | Durgin et al. | |
| 8,321,936 B1 | 11/2012 | Green et al. | |
| 8,340,300 B2 | 12/2012 | Lin | |
| 8,364,983 B2 | 1/2013 | Rangegowda et al. | |
| 8,379,857 B1 | 2/2013 | Zheng | |
| 8,412,945 B2 | 4/2013 | Sweet et al. | |
| 8,498,417 B1 | 7/2013 | Harwood et al. | |
| 8,555,053 B1 | 10/2013 | Vitalo et al. | |
| 8,584,216 B1 | 11/2013 | Allen | |
| 8,601,583 B1 | 12/2013 | Chandrasekhar et al. | |
| 8,751,828 B1 * | 6/2014 | Raizen | H04L 9/08 |
| | | | 380/278 |
| 9,027,135 B1 | 5/2015 | Aziz | |
| 9,154,327 B1 * | 10/2015 | Marino | H04L 67/10 |
| 9,171,178 B1 | 10/2015 | Banerjee | |
| 9,178,698 B1 | 11/2015 | Jarjur et al. | |
| 9,246,876 B1 | 1/2016 | Melam et al. | |
| 9,264,313 B1 | 2/2016 | Manuguri et al. | |
| 9,317,316 B2 | 4/2016 | Liu | |
| 9,430,295 B1 | 8/2016 | Eizadi et al. | |
| 9,489,519 B2 | 11/2016 | Feroz et al. | |
| 9,613,218 B2 | 4/2017 | Thota et al. | |
| 9,792,447 B2 | 10/2017 | Thota et al. | |
| 9,924,354 B2 | 3/2018 | Zhang et al. | |
| 9,930,066 B2 | 3/2018 | Chopra et al. | |
| 10,445,509 B2 | 10/2019 | Thota et al. | |
| 10,747,888 B2 | 8/2020 | Thota et al. | |
| 10,771,505 B2 | 9/2020 | Chopra et al. | |
| 10,798,073 B2 | 10/2020 | Jahid et al. | |
| 2002/0114453 A1 | 8/2002 | Bartholet et al. | |
| 2003/0065941 A1 | 4/2003 | Ballard et al. | |
| 2003/0079000 A1 | 4/2003 | Chamberlain | |
| 2003/0093481 A1 | 5/2003 | Mitchell et al. | |
| 2003/0149781 A1 | 8/2003 | Yared et al. | |
| 2004/0044891 A1 | 3/2004 | Hanzlik et al. | |
| 2004/0105549 A1 | 6/2004 | Suzuki et al. | |
| 2004/0143734 A1 * | 7/2004 | Buer | H04L 63/0485 |
| | | | 713/153 |
| 2005/0102525 A1 | 5/2005 | Akimoto | |
| 2005/0198370 A1 | 9/2005 | Miller et al. | |
| 2006/0193473 A1 * | 8/2006 | Fu | H04L 9/321 |
| | | | 380/277 |
| 2007/0061492 A1 | 3/2007 | Riel | |
| 2007/0079307 A1 | 4/2007 | Dhawan et al. | |
| 2007/0098010 A1 | 5/2007 | Dube et al. | |
| 2007/0098178 A1 * | 5/2007 | Raikar | H04L 63/062 |
| | | | 380/282 |
| 2007/0157309 A1 | 7/2007 | Bin et al. | |
| 2007/0169190 A1 | 7/2007 | Kolton et al. | |
| 2007/0198837 A1 * | 8/2007 | Koodli | H04W 12/0471 |
| | | | 713/153 |
| 2008/0002724 A1 * | 1/2008 | Grewal | H04L 63/104 |
| | | | 370/401 |
| 2008/0005782 A1 | 1/2008 | Aziz | |
| 2008/0072305 A1 | 3/2008 | Casado et al. | |
| 2008/0082834 A1 * | 4/2008 | Mattsson | G06F 12/1408 |
| | | | 715/765 |
| 2008/0104692 A1 * | 5/2008 | McAlister | H04L 63/20 |
| | | | 726/15 |
| 2008/0155252 A1 | 6/2008 | Nambiar | |
| 2008/0170689 A1 | 7/2008 | Boubion et al. | |
| 2008/0183882 A1 | 7/2008 | Flynn et al. | |
| 2008/0215880 A1 | 9/2008 | Guichard et al. | |
| 2008/0244569 A1 | 10/2008 | Challener et al. | |
| 2008/0260159 A1 | 10/2008 | Osaki | |
| 2009/0089351 A1 * | 4/2009 | Belgaied | H04L 49/9063 |
| | | | 709/201 |
| 2009/0129271 A1 | 5/2009 | Ramankutty et al. | |
| 2009/0235325 A1 | 9/2009 | Dimitrakos et al. | |
| 2009/0238080 A1 | 9/2009 | Hirano et al. | |
| 2009/0268903 A1 | 10/2009 | Bojinov et al. | |
| 2009/0282266 A1 * | 11/2009 | Fries | G06F 21/602 |
| | | | 713/193 |
| 2009/0319772 A1 | 12/2009 | Singh et al. | |
| 2010/0031318 A1 | 2/2010 | Gardcia et al. | |
| 2010/0031353 A1 | 2/2010 | Thomas et al. | |
| 2010/0058051 A1 * | 3/2010 | Imai | H04L 63/0272 |
| | | | 713/152 |
| 2010/0107162 A1 * | 4/2010 | Edwards | H04L 45/58 |
| | | | 718/1 |
| 2010/0138656 A1 | 6/2010 | Chinen et al. | |
| 2010/0153701 A1 | 6/2010 | Shenoy et al. | |
| 2010/0303241 A1 | 12/2010 | Breyel | |
| 2011/0035494 A1 | 2/2011 | Pandey et al. | |
| 2011/0085563 A1 | 4/2011 | Kotha et al. | |
| 2011/0093689 A1 | 4/2011 | Pant et al. | |
| 2011/0161676 A1 | 6/2011 | Datta et al. | |
| 2011/0179412 A1 * | 7/2011 | Nakae | G06F 21/53 |
| | | | 718/1 |
| 2011/0208960 A1 | 8/2011 | Flood | |
| 2011/0295708 A1 | 12/2011 | Shin | |
| 2011/0302415 A1 | 12/2011 | Ahmad et al. | |
| 2012/0045059 A1 | 2/2012 | Fujinami | |
| 2012/0084838 A1 * | 4/2012 | Inforzato | H04L 63/10 |
| | | | 726/4 |
| 2012/0110055 A1 * | 5/2012 | Van Biljon | G06Q 30/04 |
| | | | 709/201 |
| 2012/0110328 A1 | 5/2012 | Pate et al. | |
| 2012/0127991 A1 | 5/2012 | Rouzic et al. | |
| 2012/0155643 A1 | 6/2012 | Hassan et al. | |
| 2012/0260102 A1 | 10/2012 | Zaks et al. | |
| 2012/0284712 A1 | 11/2012 | Nimmagadda et al. | |
| 2012/0304244 A1 | 11/2012 | Xie et al. | |
| 2012/0321087 A1 | 12/2012 | Fleischman et al. | |
| 2012/0331284 A1 | 12/2012 | Kouladjie et al. | |
| 2012/0331545 A1 | 12/2012 | Baliga et al. | |
| 2013/0019306 A1 | 1/2013 | Lagar-Cavilla et al. | |
| 2013/0033993 A1 | 2/2013 | Cardona et al. | |
| 2013/0034094 A1 | 2/2013 | Cardona et al. | |
| 2013/0034109 A1 | 2/2013 | Cardona et al. | |
| 2013/0036470 A1 | 2/2013 | Zhu et al. | |
| 2013/0051399 A1 | 2/2013 | Zhang et al. | |
| 2013/0067213 A1 | 3/2013 | Liu | |
| 2013/0073743 A1 | 3/2013 | Ramasamy et al. | |
| 2013/0085880 A1 | 4/2013 | Roth et al. | |
| 2013/0091540 A1 | 4/2013 | Chen et al. | |
| 2013/0117849 A1 | 5/2013 | Golshan et al. | |
| 2013/0132722 A1 | 5/2013 | Bennett et al. | |
| 2013/0163594 A1 | 6/2013 | Sharma et al. | |
| 2013/0212279 A1 | 8/2013 | Dutta et al. | |
| 2013/0212395 A1 | 8/2013 | D'Souza et al. | |
| 2013/0227303 A1 | 8/2013 | Kadatch et al. | |
| 2013/0227550 A1 | 8/2013 | Weinstein et al. | |

(56) References Cited

U.S. PATENT DOCUMENTS

| | | | |
|---|---|---|---|
| 2013/0227558 A1* | 8/2013 | Du | G06F 9/5077 718/1 |
| 2013/0232202 A1* | 9/2013 | Fan | H04L 45/58 709/204 |
| 2013/0318345 A1* | 11/2013 | Hengeveld | H04L 12/4633 713/168 |
| 2013/0322453 A1 | 12/2013 | Allan | |
| 2013/0332983 A1 | 12/2013 | Koorevaar et al. | |
| 2014/0019750 A1 | 1/2014 | Dodgson et al. | |
| 2014/0019959 A1 | 1/2014 | Dodgson et al. | |
| 2014/0050091 A1* | 2/2014 | Biswas | H04L 67/1023 370/235 |
| 2014/0052877 A1* | 2/2014 | Mao | H04L 12/4641 709/245 |
| 2014/0053245 A1* | 2/2014 | Tosa | G06F 9/45558 726/4 |
| 2014/0059544 A1 | 2/2014 | Koganty et al. | |
| 2014/0068602 A1 | 3/2014 | Gember et al. | |
| 2014/0075518 A1 | 3/2014 | D'Souza et al. | |
| 2014/0089658 A1* | 3/2014 | Raghuram | G06F 9/45533 380/278 |
| 2014/0095868 A1* | 4/2014 | Korthny | G06F 21/64 713/165 |
| 2014/0115578 A1 | 4/2014 | Cooper et al. | |
| 2014/0122675 A1* | 5/2014 | Cohen | H04L 12/413 709/223 |
| 2014/0123230 A1 | 5/2014 | Farina et al. | |
| 2014/0181975 A1 | 6/2014 | Spemow et al. | |
| 2014/0189235 A1* | 7/2014 | Obligacion | G06F 9/45558 711/164 |
| 2014/0226820 A1 | 8/2014 | Chopra et al. | |
| 2014/0237539 A1 | 8/2014 | Wing et al. | |
| 2014/0280836 A1 | 9/2014 | Kumar et al. | |
| 2014/0282518 A1 | 9/2014 | Banerjee | |
| 2014/0310415 A1 | 10/2014 | Kimer et al. | |
| 2014/0317737 A1 | 10/2014 | Shin et al. | |
| 2015/0003453 A1 | 1/2015 | Sengupta et al. | |
| 2015/0071298 A1 | 3/2015 | Combs et al. | |
| 2015/0078550 A1 | 3/2015 | Ferguson et al. | |
| 2015/0086020 A1 | 3/2015 | Harjula et al. | |
| 2015/0150073 A1 | 5/2015 | Bhalerao et al. | |
| 2015/0220745 A1 | 8/2015 | Nellitheertha et al. | |
| 2015/0222604 A1 | 8/2015 | Ylonen | |
| 2015/0222621 A1 | 8/2015 | Baum et al. | |
| 2015/0242594 A1 | 8/2015 | Harjula et al. | |
| 2015/0358231 A1 | 12/2015 | Zhang et al. | |
| 2015/0372980 A1 | 12/2015 | Eyada | |
| 2015/0379277 A1 | 12/2015 | Thota et al. | |
| 2015/0379278 A1 | 12/2015 | Thota et al. | |
| 2015/0379279 A1 | 12/2015 | Feroz et al. | |
| 2015/0379280 A1 | 12/2015 | Thota et al. | |
| 2015/0379281 A1 | 12/2015 | Feroz et al. | |
| 2015/0379282 A1 | 12/2015 | Thota et al. | |
| 2015/0381362 A1 | 12/2015 | Thota et al. | |
| 2015/0381578 A1 | 12/2015 | Thota et al. | |
| 2016/0099968 A1* | 4/2016 | Chopra | H04L 63/0876 713/151 |
| 2016/0132347 A1 | 5/2016 | Brandwine et al. | |
| 2016/0337346 A1 | 11/2016 | Momchilov et al. | |
| 2017/0005882 A1 | 1/2017 | Tao et al. | |
| 2017/0006018 A1 | 1/2017 | Campagna et al. | |
| 2017/0244693 A1 | 8/2017 | Papadopoulos et al. | |
| 2017/0302696 A1 | 10/2017 | Schutz et al. | |
| 2018/0063103 A1 | 3/2018 | Jahid et al. | |
| 2021/0036997 A1 | 2/2021 | Jahid et al. | |

FOREIGN PATENT DOCUMENTS

| | | |
|---|---|---|
| CN | 102238002 A | 11/2011 |
| CN | 102546601 A | 7/2012 |
| CN | 103051510 A | 4/2013 |
| EP | 0887981 A2 | 12/1998 |
| JP | 2006185341 A | 7/2006 |
| WO | 2008095010 A1 | 8/2008 |
| WO | 2016003491 A1 | 1/2016 |

OTHER PUBLICATIONS

Casado, Martin, et al., "SANE: A Protection Architecture for Enterprise Networks," Proceedings of the 15th USENIX Security Symposium, Jul. 31-Aug. 4, 2006, 15 pages, USENIX, Vancouver, Canada.

Guichard, J., et al., "Network Service Chaining Problem Statement," Network Working Group, Jun. 13, 2013, 14 pages, Cisco Systems, Inc.

Joseph, Dilip Anthony, et al., "A Policy-aware Switching Layer for Data Centers," Jun. 24, 2008, 26 pages, Electrical Engineering and Computer Sciences, University of California, Berkeley, CA, USA.

Kent, Stephen, "IP Encapsulating Security Payload (ESP)," RFC 4303, Dec. 2005, 44 pages, The Internet Society.

Lin, Li, et al., "Data Offload Strategy for Multiple Connections in Wireless Sensor Networks," Journal of Huazhong University of Science and Technology (Natural Science Edition), Dec. 2005, 4 pages, vol. 33.

Popa, Lucian, et al., "Building Extensible Networks with Rule-Based Forwarding," In USENIX OSDI, Month Unknown 2010, 14 pages.

Sekar, Vyas, et al., "Design and Implementation of a Consolidated Middlebox Architecture," 9th USENIX Symposium on Networked Systems Design and Implementation, Apr. 25-27, 2012, 14 pages, USENIX, San Jose, CA, USA.

Sherry, Justine, et al., "Making Middleboxes Someone Else's Problem: Network Processing as a Cloud Service," In Proc. of SIGCOMM '12, Aug. 13-17, 2012, 12 pages, Helsinki, Finland.

Varalakshmi, P., et al., "Integrity Checking for Cloud Environment Using Encryption Algorithm," 2012 International Conference on Recent Trends in Information Technology, Apr. 19-21, 2012, 5 pages, IEEE, Chennai, Tamil Nadu, India.

\* cited by examiner

Ethernet Frame from vNIC

Encrypted Ethernet Frame

Ethernet Frame from vNIC

Encrypted Ethernet Frame

INFRASTRUCTURE LEVEL LAN SECURITY

CROSS-REFERENCE TO RELATED APPLICATIONS

This application is a continuation of U.S. patent application Ser. No. 14/965,870, filed Dec. 10, 2015, now published as U.S. Patent Publication 2016/0099968. U.S. patent application Ser. No. 14/965,870, is a continuation application of U.S. patent application Ser. No. 13/765,618, filed Feb. 12, 2013, now issued as U.S. Pat. No. 9,930,066. U.S. patent application Ser. No. 14/965,870, now published as U.S. Patent Publication 2016/0099968, and U.S. patent application Ser. No. 13/765,618, now issued as U.S. Pat. No. 9,930,066 are incorporated herein by reference.

BACKGROUND

Cloud computing is a service model where computing resources are delivered over a network. Typically, a common virtualized infrastructure is used to provide services for multiple client organization (tenants). Advantages of cloud computing include lower costs through shared computing and network infrastructure, on-demand provisioning of resources, and multi-tenant solutions, among others.

Data security within the shared cloud network infrastructure is a major concern. Although secure web services and virtual private networks (VPNs) can provide secure communication with the cloud, such security ends at the entry point to the cloud provider. That is, data traversing the internal network of the cloud provider's infrastructure typically flows in an unsecure manner.

One solution for securing data traversing the provider's internal network uses virtual local area networks (VLANs), which afford tenants segregated logical networks. However, VLANs may allow malicious entities to gain unauthorized access to network data by means such as passive wiretapping, masquerading attacks, man-in-the-middle attacks, private VLAN attacks, and some denial of service attacks.

Another solution for securing data traversing the provider's internal network relies on point-to-point encryption techniques, such as Secure Sockets Layer (SSL) or IPSec. However, such techniques, which typically require negotiation of encryption keys by each pair of endpoints wishing to communicate securely, do not scale well. For example, if n virtual machines (VMs) (or applications running thereon) wish to communicate securely with each other, then each VM (or application) must be capable of performing the particular type of encryption (e.g., SSL encryption), as well as negotiate and manage $n*(n-1)$ security keys.

SUMMARY

Embodiments presented herein provide techniques for securing traffic in a multi-tenant virtualized infrastructure. The techniques include intercepting a Layer 2 (L2) frame sent via a first virtual network interface card (vNIC) in route to a first physical network interface card (pNIC) and determining a first secure wire to which the first vNIC is connected, the first secure wire being enabled on a first L2 domain. The techniques further include encrypting payload data of the L2 frame using a first encryption key associated with the first secure wire.

Further embodiments of the present invention include a computer-readable storage medium storing instructions that when executed by a computer system cause the computer system to perform one or more the of the techniques set forth above, and a computer system programmed to carry out one or more of the techniques set forth above.

DETAILED DESCRIPTION

Figure 1:
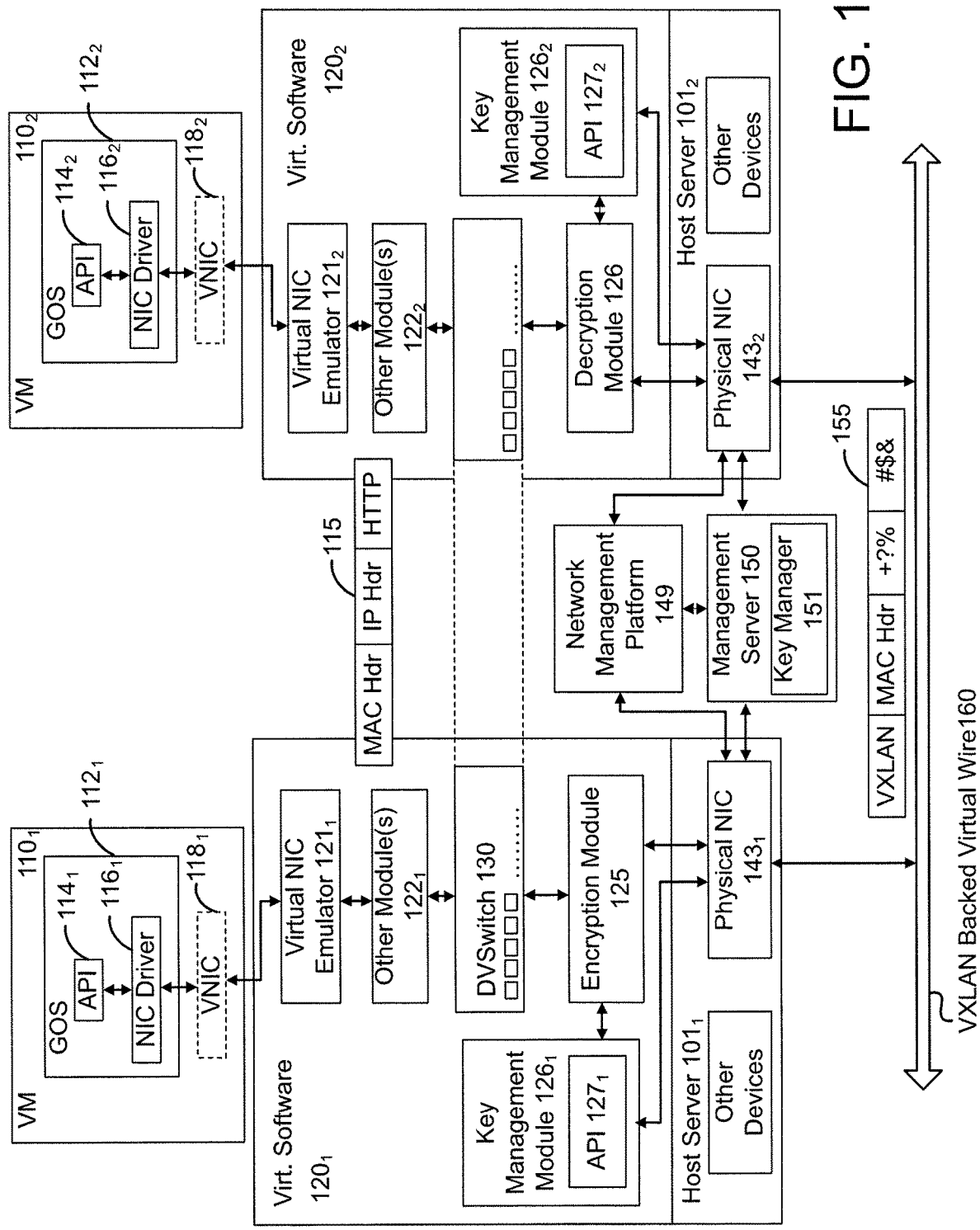
FIG. 1 illustrates a system in which embodiments may be implemented.

Embodiments presented herein secure traffic flowing across multi-tenant virtualized infrastructures using group key-based encryption while being transparent to virtual machines (VMs) and application(s) running within VMs. In one embodiment, an encryption module in a VM host intercepts Layer 2 (L2) frames i.e., Ethernet frames which a VM sends via its virtual network interface card (vNIC). The encryption module then determines whether the vNIC is connected to a "secure wire." As used herein, "secure wire" is an infrastructure-level construct over which at least some L2 traffic is encrypted after leaving source vNIC(s) and decrypted before reaching target vNIC(s). A group encryption key may be associated with the secure wire such that entities (e.g., VMs and physical servers) belonging to one secure wire context share the same encryption key. Upon determining that a vNIC, from which L2 frames are sent, is connected to a given secure wire, the encryption module invokes an API exposed by a key management module to encrypt the frame data. Encryption keys are kept local to the key management module, which is responsible for fetching the keys from a centralized key manager and which exposes the API for encrypting frame data using the keys. Alternatively, key management module may use hardware chips to perform cryptographics operations in a manner that is transparent to encryption module. Frames having encrypted payloads and additional fields are also referred to herein as "encrypted frames." In one embodiment, all traffic flowing over the secure wire may be encrypted. In alternative embodiments, the policy may specify which traffic to encrypt and the encryption module may intercept only the specified traffic for encryption. For example, the policy may specify encrypting only packets flowing from a VM with IP address X and destined to an HTTP server on IP address Y and port 80, securing traffic from address X to address Y but permitting address Y to continue to receive unencrypted frames from other VMs. In a further embodiment, the encryption module may be located at a layer farthest from a vNIC of the VM. That is, other VM host modules which act on the L2 frames (e.g., by applying policy decisions or application level modifications) are at layers closer to the vNIC and can thus process the L2 frames before those frames are passed on to the encryption module. This ensures that the functionality of the other VM host modules are unaffected by the L2 frame encryption. Embodiments may also support IEEE 802.1AE MAC Security (MACsec) standard, Group Domain of Interpretation (GDOI), and the like so that secure wires may stretch to include physical devices.

The encryption module forwards encrypted frames to a physical network interface card, which transmits the encrypted frames via a physical layer network medium. Unauthorized network entities (i.e., entities not connected to the secure wire) that gain access to encrypted frames cannot decipher the frames' payloads. A decryption module in a VM host supporting a VM which includes the target vNIC may intercept the encrypted frame before the frame reaches the target vNIC. The decryption module may then decrypt the encrypted data of the frame and forward the decrypted frame to the target vNIC. In one embodiment, the decryption module may be located at a layer farthest from a vNIC of the receiving VM, such that other VM host modules may act on the decrypted L2 frames before the frames are passed to the target vNIC.

Reference is now made in detail to several embodiments, examples of which are illustrated in the accompanying figures. It is noted that wherever practicable similar or like reference numbers may be used in the figures and may indicate similar or like functionality. The figures depict embodiments for purposes of illustration only. One skilled in the art will readily recognize from the following description that alternative embodiments of the structures and methods illustrated herein may be employed without departing from the principles described herein.

FIG. 1 illustrates a system in which embodiments may be implemented. As shown, the system includes host servers $101_{1-2}$, key management server 150, and virtual extensible LAN (VXLAN) backed virtual wire 160. Host servers $101_{1-2}$ provide virtualization-based distributed services to information technology environments. Illustratively, host servers $101_{1-2}$ each support a virtual machine host $120_{1-2}$. Each virtual machine host $120_{1-2}$ may itself include virtualization software that shares hardware resources (e.g., processors, memory, disks, etc.) among virtual machines and provides an interface between guest software running on virtual machines $110_1$ and $110_2$, and the underlying hardware of host servers $101_1$ and $101_2$. VM hosts $120_{1-2}$ may run directly on hardware components of host servers $101_{1-2}$ or on top of an operating system of host servers $101_{1-2}$. In a particular embodiment, VM hosts $120_{1-2}$ may be VMware ESX® Servers. Note, host servers $101_1$ and $101_2$ may belong to different physical subnetworks. As a result, packets sent between host servers $101_{1-2}$ may flow over intermediate network devices that could otherwise inspect and/or alter the packets. Techniques disclosed herein encrypt packet data, permitting VMs $110_{1-2}$ to communicate securely.

As shown, VM hosts $120_{1-2}$ each include a virtual network interface card (vNIC) emulator $121_{1-2}$ which interacts with NIC drivers $116_{1-2}$ in VMs $110_{1-2}$, to send and receive data to and from VMs $110_{1-2}$. In particular, each vNIC emulator $121_{1-2}$ may maintain the state for one or more vNICs for each VM $110_{1-2}$. Alternatively, multiple instances of vNIC emulators may be instantiated within a virtualization software layer of VM hosts $120_{1-2}$. In either case, a single VM may have one or more vNICs. Illustratively, FIG. 1 shows one vNIC for each VM, and only one VM for each host. However, the discussion of vNICs $118_{1-2}$ actually describes a vNIC state implemented and maintained by each vNIC emulator $121_{1-2}$, respectively. Virtual devices such as vNICs $118_{1-2}$ are software abstractions convenient to discuss as though part of VMs $110_{1-2}$, but are actually implemented by virtualization software of VM hosts $120_{1-2}$ using emulators $121_{1-2}$. The state of each VM $110_{1-2}$, however, includes the state of its virtual devices, which is controlled and maintained by the underlying VM hosts $120_{1-2}$.

As also shown, the VM hosts $120_{1-2}$ each include a component of a distributed virtual switch (DVSwitch) 130. The DVSwitch 130 is a software abstraction which binds virtual switches in a managed collection into a single, logical configurable entity. Each of the ports of the DVSwitch 130, referred to herein as DVPorts, may include data structures representing the configuration and runtime states of a virtual port of a virtual switch supported by a VM host. DVPorts may be created with, e.g., a configuration predefined by a network administrator. Virtual ports are initialized with a blank configuration state, but once associated with a DVPort, assume the configuration and runtime state of the associated DVPort. When a VM is migrated or powered off and on, the "connection" between a DVPort and a virtual NIC is not affected because the DVPort persists and migrates with the VM to which it is connected. A further description of DVSwitches is provided in U.S. Pat. No. 8,195,774 B2, which is hereby incorporated by reference in its entirety. Note, in alternative embodiments, switches other than DVSwitches (i.e., other types of virtual switches) may be used.

Encryption module 125 intercepts L2 frames sent via vNIC $118_1$, invokes an API $127_1$ exposed by a key management module $126_1$, discussed in greater detail below, to encrypt the frames' data, then forwards the encrypted frames to a physical NIC $143_1$. As shown, encryption module 125 may be located at a layer between DVSwitch 130 and physical network interface card (pNIC) $143_1$, such that secure wire is transparent to DVSwitch 130 and VM $110_1$. That is, DVSwitch 130 and VM $110_1$ may be unaware of the secure wire and the encrypted frames transmitted over the secure wire. The intercepted L2 frames such as Ethernet frame 115 each encapsulate an Internet Protocol (IP) packet which itself encapsulates a Hypertext Transfer Protocol (HTTP) request (or other application layer packet). After intercepting the L2 frames from vNIC $118_1$, encryption module 125 may determine which secure wire, if any, vNIC $118_1$ belongs to, and invoke the API $127_1$ to encrypt the frames. That is, secure wire membership may be derived based on the membership of vNIC $118_1$, from which the packet has arrived, such that if vNIC $118_1$ belongs to a given secure wire, the encryption module 125 takes further action(s) to encrypt the packets. In an alternative embodiment, secure wire membership may be derived based on policies. That is, the encryption module 125 may inspect packets and decide secure wire membership based on packet characteristics, as discussed in greater detail below.

Each secure wire is associated with a group encryption key. Group encryption keys may be managed via a key manager application 151 of a management server 150. Application(s) running on the management server 150 may generate the encryption key when the secure wire is created. For example, a user may create a virtual extensible LAN (VXLAN) backed virtual wire 160 via an interface provided by a network management platform 149 and set secure wire as "enabled" on virtual wire 160. The network management platform 149 may then program the key manager application 151 on the management server to generate the encryption key. In a particular embodiment, the network management platform 149 may be a VMware vShield™ Manager, and the key manager application 151 may be Key Management Interoperability Protocol (KMIP) compliant. In an alternative embodiment, the user may also configure manual group keys on the virtualization management platform if no management server 150 is available.

In general, VXLAN permits L2 logical networks to be created with a 24-bit segment ID used to differentiate the L2 networks. In addition, VXLAN uses MAC in IP encapsulation to stretch L2 networks across layer 3 (L3) boundaries. In particular, Ethernet frames from VMs may be encapsulated inside UDP, with the UDP header used to traverse L3 boundaries. A user may wish to enable secure wire on VXLAN backed virtual wire 160 so that Ethernet frame data is encrypted before the frames are encapsulated in UDP. Illustratively, encryption module 125 may invoke API 127$_1$ to encrypt frame data, and a further virtualization software module (not shown) may create VXLAN packets (e.g., packet 155) which encapsulate the encrypted frames. The VXLAN packets are then forwarded to a pNIC 143$_1$ for transmission over VXLAN backed virtual wire 160.

As discussed, a key manager application 151 may manage group encryption keys. Key management modules 126$_{1-2}$ in virtualization software 120$_{1-2}$ may securely fetch the appropriate keys from the key manager application 151 when vNICs 118$_{1-2}$ join secure wire(s), respectively. For example, the key manager application 151 may use SSL or similar point-to-point security techniques to push keys to key management modules 126$_{1-2}$. In one embodiment, key management modules 126$_{1-2}$ may manage keys for virtualization software 120$_{1-2}$, respectively, and expose a framework of cryptographic libraries which encryption module 125 and decryption module 126 consume. For example, encryption module 125 may create a session per secure wire, and key management module 126$_1$ may fetch the appropriate key for a newly created secure wire and associate the key with the secure wire. Here, group keys may expire after a given time, and in such cases the keys may be refreshed periodically. In a particular embodiment, the key management module 126$_1$ may be a VMware vCrypto® module. In another embodiment, key manager application 151 may be a key management interoperability protocol (KMIP) server application, and the key management module 126$_1$ may negotiate an SSL channel with the KMIP server to retrieve group keys. In yet another embodiment, the key manager application 151 may be a Group Domain of Interpretation (GDOI) server application, and key management module 126$_1$ may communicate with key manager application 151 via a secure channel negotiated over Internet Key Exchange (IKE) phase 1.

Assuming encryption keys are available via the key management module 126$_1$, the encryption module 125 invokes an API 127$_1$ exposed by key management module 126$_1$ to encrypt Ethernet frame data from vNIC 118$_1$. Here, the API 127$_1$ may accept plain text data and return cipher text. As a result, encryption keys are kept local to key management module 126$_1$ and not available outside its boundary. That is, the key management module 126$_1$ performs group key negotiation and actual encryption of frames. On the other hand, the encryption module 125 is responsible for intercepting traffic, and uses interfaces provided by the key management module 126$_1$ to encrypt the traffic. In an alternative embodiment, the key management module 126$_1$ may use hardware chips to perform cryptographics operations in a manner that is transparent to encryption module 125.

Of course, encryption keys may be managed and used in other ways. For example, encryption module 125 may itself manage keys and perform encryption using the keys. In any case, encrypted frames may be encapsulated in a VXLAN packet and sent over virtual wire 160. In one embodiment, data of Ethernet frames sent via vNIC 118$_1$ may be encrypted using an appropriate key if vNIC 118$_1$ is connected to a secure wire. In alternative embodiments, encryption may be policy-based. That is, Ethernet frames may be selectively encrypted based on policies specifying which traffic to encrypt. For example, the policy may specify that frames with a given source and/or destination IP address are encrypted. As another example, the policy may specify that encryption is performed at higher layers (e.g., OSI Layer 3 (L3) or Layer 4 (L4)), as discussed in greater detail below.

As shown, the encryption module 125 is located at a layer farthest from the vNIC 118$_1$. This configuration permits other modules 122$_1$ which apply logic (e.g., policy decisions or application level modifications) to the L2 frames to see clear traffic. Note, in some embodiments (e.g., MACSEC encryption), the encryption module 125 may be above the VXLAN layer, while in other embodiments (e.g., GDOI) the encryption module 125 may be below the VXLAN layer.

On reaching VM host 120$_2$, the VXLAN packet which includes the encrypted packet is stripped of its VXLAN header and forwarded to vNIC 118$_2$ based on the destination MAC address specified in the frame. Before reaching vNIC 118$_2$, a decryption module 126 intercepts the frame and invokes API 127$_2$, exposed by key management module 126$_2$, to decipher the frame data using the key indicated in a Key ID field of the frame. Similar to the key management module 126$_1$, the key management module 126$_2$ may perform group key negotiation and actual decryption of frames. Decryption module 126 may then be responsible for intercepting traffic and using interfaces provided by the key management module 126$_2$ to decrypt the traffic. Note, in one embodiment, the decryption module 126 may also encrypt outgoing frames, and the encryption module 125 may also decrypt inbound frames.

Once decrypted, the decryption module 126 may forward frames to DVSwitch 130 for transmission to vNIC 118$_2$ of VM 110$_2$. Here, decryption may not actually be successful if vNICs 118$_1$ and 118$_2$ do not belong to the same secure wire, and thus do not share the same encryption key. In such a case, the key management module 126$_2$ may lack the key to decrypt the frame, and VM 110$_2$ will receive a frame which includes garbled data. Illustratively, the decryption module 126 is located at a layer farthest from vNIC 118$_1$. Similar to the placement of encryption module 125 at a layer farthest from vNIC 118$_2$, such a configuration permits other modules 122$_2$ which apply logic to the received L2 frames to see clear traffic.

Although discussed above relative to VXLAN, a secure wire may be used to provide security on other L2 domains. For example, a secure wire may be enabled for a distributed virtual port group (dvPG) associated with DVSwitch 130. In one embodiment, the scope of the secure wire may be inherited by underlying constructs of the L2 domain such that, e.g., when a secure wire is enabled on a VXLAN backed virtual wire, the secure wire is inherited by dvPGs of the virtual wire. As another example, when secure wire is enabled on a dvPG, the secure wire may be inherited by port groups (PGs) of the dvPG.

Figure 2:
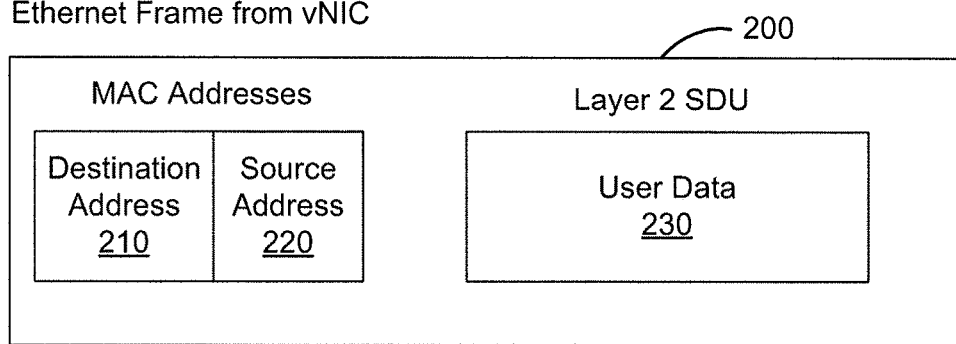
FIG. 2 illustrates an example encrypted Ethernet frame, according to an embodiment of the invention.
Figure 2:
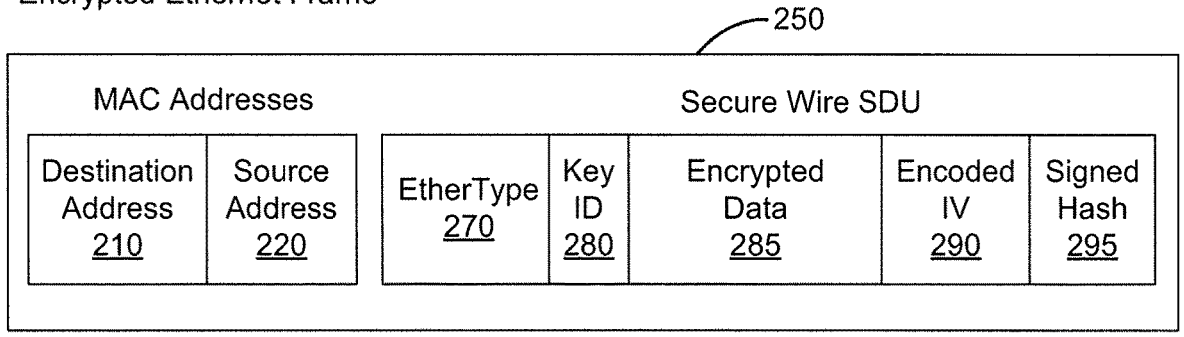

FIG. 2 illustrates an example encrypted Ethernet frame, according to an embodiment. As shown, a normal Ethernet frame 200 received from a vNIC includes MAC address fields 210, 220 and user data 230. The Ethernet frame 200 may also include, e.g., a preamble, a frame check sequence, and the like. In contrast, the encrypted Ethernet frame 250 includes the same MAC addresses 210, 220, as well as encrypted user data 285 and the following additional fields: EtherType 270, Key ID 280, Encoded Initialization Vector (IV) 290, and Signed Hash 295. Here, EtherType 270 may specify the type of protocol encapsulated in the payload as, e.g., "SecureWirePacket" or a similar designation. Key ID 280 and Encoded IV 290 are parameters used to encrypt the user data 230 to generate encrypted data 285. As discussed, the encryption module may invoke an API exposed by a key management module to encrypt frame data using a group encryption key which is unique to the particular secure wire. Key ID 280 may identify the encryption key used so that a decryption module on a receiving VM host may invoke an API to perform decryption based on the key identified by Key ID 280.

The actual encryption may be performed using the encryption key identified by the Key ID 280 and an initialization vector, such as a timestamp, which as illustrated is included in the Encoded IV 290 field of the encrypted frame. Advantageously, sending the initialization vector with the encrypted frame may avoid replay attacks, dictionary attacks, and the like. In one embodiment, the encryption module may encrypt data 230 using Galois/Counter mode of Advanced Encryption Standard (AES) cipher, with 128-bit encryption. Other encryption techniques may be applied and may also be indicated by Key ID 280.

Illustratively, the encrypted Ethernet frame 250 further includes a Signed Hash 295 field. The Signed Hash 295 may be a message digest (i.e., hash) encrypted using a key which is distinct from the data encryption key and generated at the creation of the secure wire. Similar to a digital signature, the Signed Hash 295 may authenticate the sender of the encrypted frame 250 and protect its data integrity by allowing changes to be detected.

Figure 3:
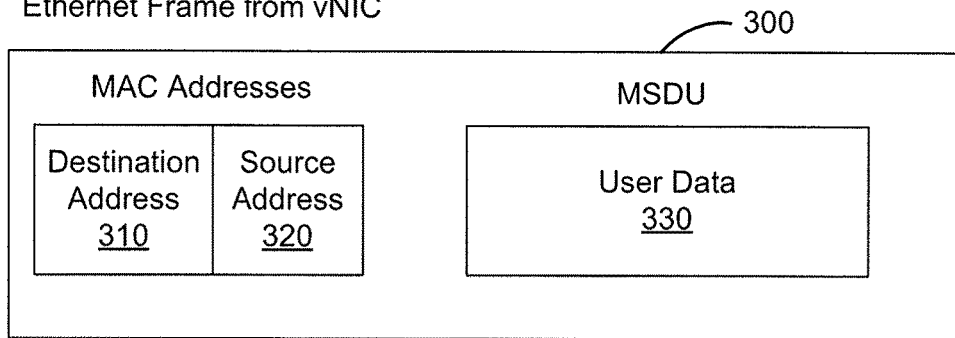
FIG. 3 illustrates another example encrypted Ethernet frame, according to an embodiment of the invention.
Figure 3:
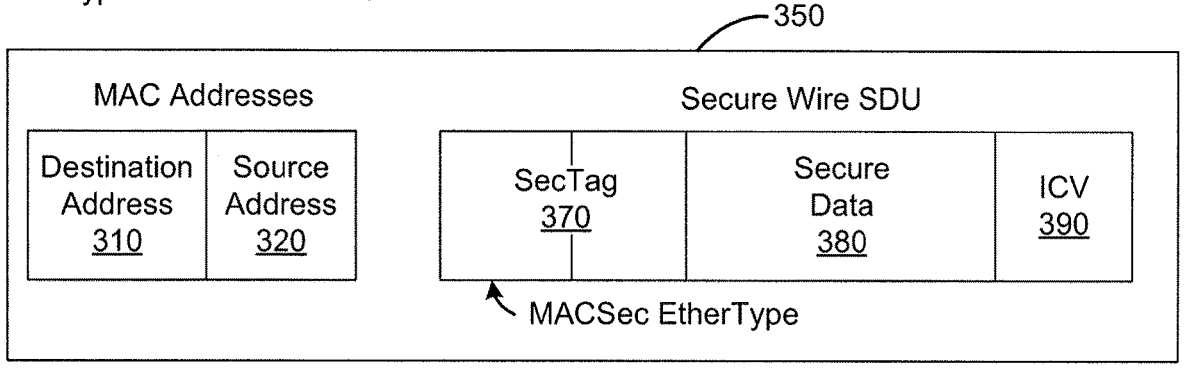

FIG. 3 illustrates another example encrypted Ethernet frame, according to an embodiment. As shown, normal Ethernet frame 300 from the vNIC is similar to Ethernet frame 200, discussed above. However, the frame data is encrypted using IEEE 802.1AE Media Access Control Security (MACSec) format, which defines connectionless data confidentiality and integrity for media access independent protocols. Illustratively, the MACSec frame includes MAC addresses 355, 360, a Security Tag (SecTag) 370, secure data 380, and an Integrity Check Value (ICV) 390 authentication code. SecTag 370 is an extension of EtherType and includes a field indicating that MACSec frame 350 is of EtherType "MACSec." Similar to Signed Hash 295, discussed above, ICV 390 is a message authentication code that permits authentication of the MACSec frame and protects data integrity of the frame. Similar to encrypted data 285, secure data 380 is user data 330 in encrypted format. MACSec provides a default cipher suite for encryption of user data and protection of data integrity, but MACSec does not specify how keys are managed and secure connections established. Thus, keys may be created and managed on a secure management server and pushed to key management modules of VM hosts, as discussed above. Advantageously, MACSec is a standard protocol used for LAN encryption, and use of MACSec frame format permits physical end points which are MACSec compliant to participate in the secure wire. In the absence of MACSec compliant physical devices, an edge router (e.g., VMware's vShield Edge®) may facilitate participation of such physical devices in the secure wire.

Figure 4:
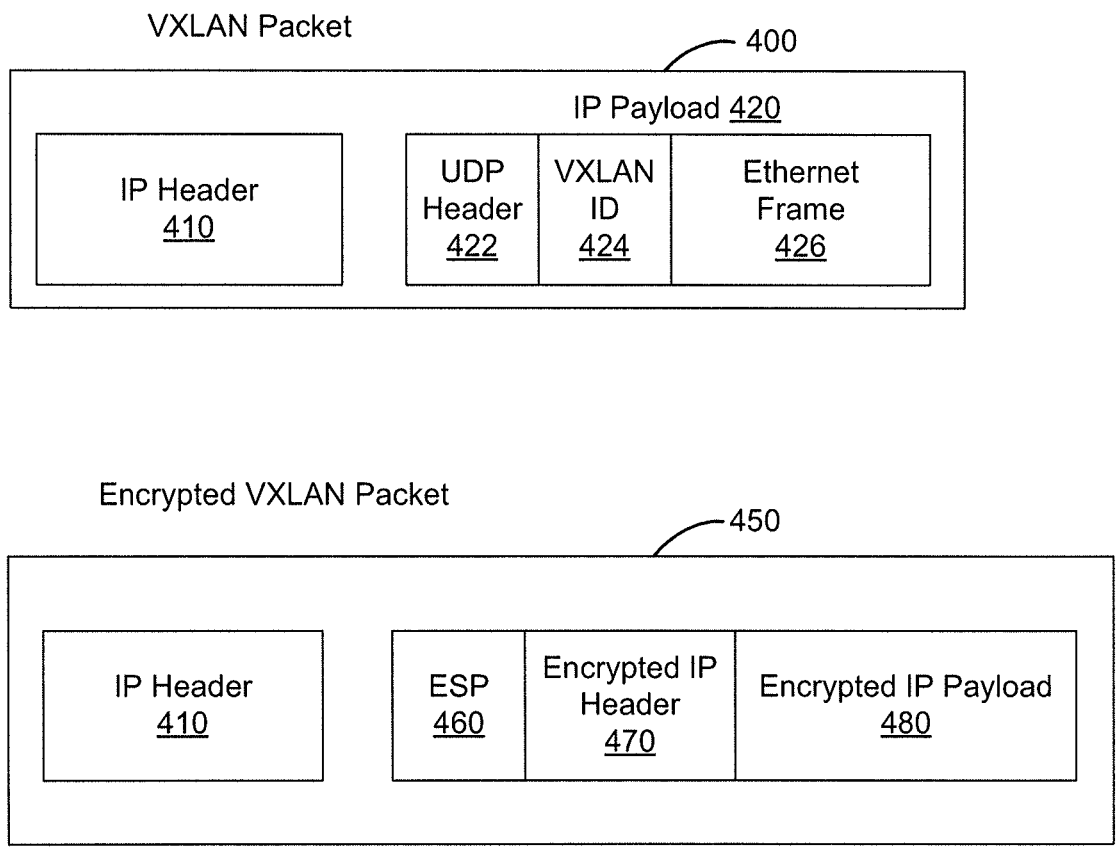
FIG. 4 illustrates an encrypted virtual extensible LAN (VXLAN) packet, according to an embodiment of the invention.

FIG. 4 illustrates an encrypted VXLAN packet, according to an embodiment. As shown, normal VXLAN packet 400 includes an IP header 410 and IP payload 420. As discussed, VXLAN uses MAC-in-IP encapsulation. Here, IP payload 420 includes a UDP header 422, a VXLAN ID field 424, and a normal Ethernet frame 426 received from a vNIC. Illustratively, encrypted VXLAN packet 450 uses IPSec in GDOI format, which is configured in Encapsulating Security Payload (ESP) tunnel mode. As shown, IP header 410 is preserved in encrypted VXLAN packet 450, and encrypted VXLAN packet 450 further includes encrypted IP header 470 and encrypted IP payload 480. IP header 410 allows encrypted traffic to be routed using underlying network infrastructure. VXLAN also needs to support multicast traffic. Header preservation and group Security Association (SA) permit replication of multicast encrypted traffic to be offloaded to the underlying network. As discussed, GDOI may provide centralized encryption key management. In particular, GDOI key manager application may authenticate group members over IKE phase 1, distribute group SA to group members, distribute group policy specifying traffic to be encrypted, periodically refresh group keys of group members, and maintain a pseudo clock to protect against replay attacks.

Figure 5:
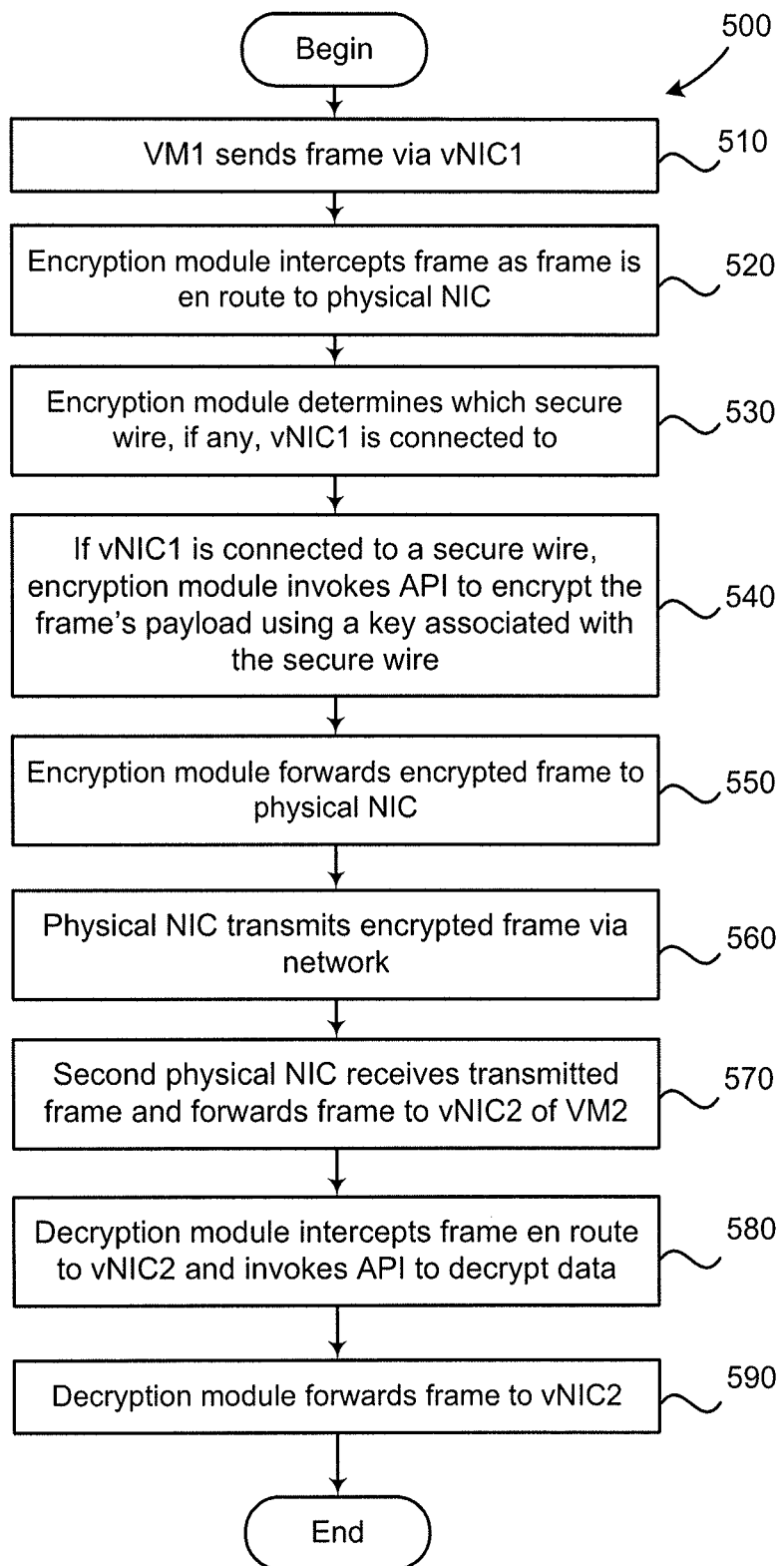
FIG. 5 illustrates a method for encrypting and transmitting data over a secure wire, according to an embodiment of the invention.

FIG. 5 illustrates a method 500 for encrypting and transmitting data over a secure wire, according to an embodiment. As shown, the method 500 begins at step 510, where a first VM (VM 1) sends a frame via a first vNIC (vNIC 1). Here, vNIC 1 may be implemented by virtualization software of a VM host which supports VM 1, as illustrated in FIG. 1.

At step 520, the encryption module intercepts the frame as the frame is en route to a pNIC. As discussed, the encryption module may be a VM host module which is located at a layer farthest from the vNIC 1, thereby permitting other modules which apply logic to frames from vNIC 1 to see clear traffic.

At step 530, the encryption module determines which secure wire, if any, vNIC 1 is connected to. As discussed, secure wire membership of the vNIC may be maintained by the encryption module such that the encryption may intercept traffic and encrypt packets from vNICs which belong to secure wires, as appropriate. Initially, secure wire may be enabled on an L2 domain, and a user may thereafter assign vNICs to that domain. For example, the secure wire may be enabled on a management server, and a management server application may automatically generate encryption keys for new secure wires. A key management module on the VM host may securely fetch (e.g., using SSL or similar point-to-point security techniques) appropriate encryption keys when vNICs on the VM host join secure wires. The key management module may further maintain mappings between encryption keys and secure wires.

If the vNIC is connected to a secure wire, then at step 540, the encryption module invokes an API exposed by the key management module to encrypt the frames' payload using the key associated with the secure wire. As discussed, the API may accept plain text data and return cipher text in one embodiment. In such a case, encryption keys are kept local to key management module $126_1$ and not available outside its boundary. The key management module $126_1$ may apply any feasible encryption technique. For example, Galois/Counter mode of Advanced Encryption Standard (AES) cipher may be used. In an alternative embodiment, key management module $126_1$ may use hardware chips to perform cryptographics operations in a manner that is transparent to encryption module 125. For example, some pNIC hardware chips support offloading of IPsec and MACsec encryption.

Additional fields may be added to the Ethernet frame such as a Key ID field identifying the encryption key and type of encryption, a timestamp initialization vector for the encryption, and a digital signature which authenticates the frame and protects data integrity of the frame. In one embodiment, the frame format of encrypted frames may be that illustrated in FIG. 2. In another embodiment, the encrypted frames may comply with the MACSec format, as illustrated in FIG. 3. In yet another embodiment, entire VXLAN packets may be encrypted, as illustrated in FIG. 4.

Although discussed above primarily with respect to all Ethernet frame payloads being encrypted if a vNIC is connected to a secure wire, the encryption module may apply encryption based on a policy in alternative embodiments. Tenants may choose policies which specify whether to perform encryption, particular traffic to encrypt, the secure wire(s) to which particular vNIC(s) belong, and the like in order to, e.g., improve performance or protect specific communications. Example policy rules are shown in Table 1.

TABLE 1

| Index | Source Mac | Destination MAC | Source IP | Source Port | Destination IP | Destination Port | Protocol | Action |
|---|---|---|---|---|---|---|---|---|
| 1 | ANY | ANY | X | ANY | Y | 80 | TCP | Encrypt to sec-wire-1 |
| 2 | ANY | ANY | Y | 80 | X | ANY | TCP | Encryp to sec-wire-2 |
| 3 | ANY | ANY | Z | 80 | ANY | ANY | TCP | Encrypt to sec-wire-1 |
| 4 | ANY | ANY | ANY | ANY | Z | 80 | TCP | Encryp to sec-wire-3 |
| 5 | ANY | ANY | ANY | ANY | ANY | 443 | ANY | Clear |
| 6 | ANY | ANY | ANY | 443 | ANY | ANY | ANY | Clear |
| 7 | ANY | ANY | ANY | ANY | ANY | ANY | ANY | Clear |
| 8 | ANY | FF:FF:FF:FF | ANY | ANY | ANY | ANY | ANY | Encrypt to sec-wire-1 |
| 9 | ANY | ANY | ANY | ANY | ANY | ANY | ANY | Encrypt to sec-wire-3 |

As per rule 1, frames flowing from a VM having IP address X and destined to an HTTP server on IP address Y and port 80 are encrypted to secure wire 1, thereby securing HTTP traffic flowing from address X to address Y. Similarly, rule 2 secures return frames flowing from Y to X by encrypting the frames to secure wire 2. Note, given rules 1 and 2, Y may continue to honor unencrypted HTTP transfers with other VMs. If HTTP server on IP address Z should be allowed to communicate only securely with all VMs, then rules 3 and 4 may be applied instead. Rules 5 and 6 permit traffic to flow without encryption for HTTPS servers. Such servers already communicate securely, so no further encryption is necessary. Adding rule 7 permits broadcast traffic to flow unencrypted so that secure and unsecure traffic may flow in a single secure wire and inter-communicate. Rule 8 may be applied to permit secure and unsecure traffic to flow in a single secure wire, but isolated from each other. Rule 9 may be applied to encrypt all traffic over a secure wire.

In a further embodiment, the policy may specify that encryption is performed at a particular layer, such as at higher OSI layers (e.g., Layer 3 (L3) or Layer 4 (L4)). If L3 payloads are encrypted, for example, L3 devices such as routers may be able to see the frames' IP headers and route the frames. As a result, the traffic may be routed through devices which do not participate in the secure wire. If L4 payloads are encrypted, the traffic may be able to pass through network address translation (NAT) devices such as load balancers.

At step 550, the encryption module forwards the encrypted frame to the pNIC, and at step 560, the pNIC transmits the encrypted frame via a network. Note, the encrypted frame may be further modified before reaching the pNIC. For example, a module may add a VXLAN header to the encrypted frame in one embodiment. At step 570, a second pNIC which is connected to the same network receives the transmitted frame. The second pNIC may then forward the transmitted frame to dvSwitch (or other virtual switch), which is responsible for routing the frame to a second vNIC (vNIC 2) of a second VM (VM 2) based on a destination MAC address indicated in the transmitted frame. In one embodiment, the received frame may be modified before being forwarded to the dvSwitch. For example, in the case of VXLAN, a module may strip a VXLAN header from the received frame.

At step 580, a decryption module intercepts the encrypted frame as the frame is en route to the DVSwitch and decrypts the frame's data by invoking an API of a key management module of the receiving VM host. Here, the key management module may use an encryption key indicated by the Key ID field of the encrypted frame. As discussed, the key management module of the receiving VM host may lack the encryption key identified by the Key ID if vNIC 2 is not connected to the same secure wire as vNIC 1, in which case decryption will not succeed. If the encrypted frame includes fields such as a message digest field, the decryption module may further authenticate the sender, ensure data integrity, etc., as appropriate, based on the value of the message digest field.

At step 590, the decryption module forwards the decrypted frame to DVSwitch which in turn forwards it to vNIC 2. Here, the decrypted frame may be an ordinary Ethernet frame. Note, vNIC 2 does not see encrypted frames, and vNIC 1 sends normal Ethernet frames, so the secure wire may be transparent to both VM1 and VM2. In one embodiment, the decryption and encryption modules may be located at a layer between the virtual and physical switches. In such a case, the secure wire may further be transparent to the virtual switch, such as the DVSwitch.

Figure 6:
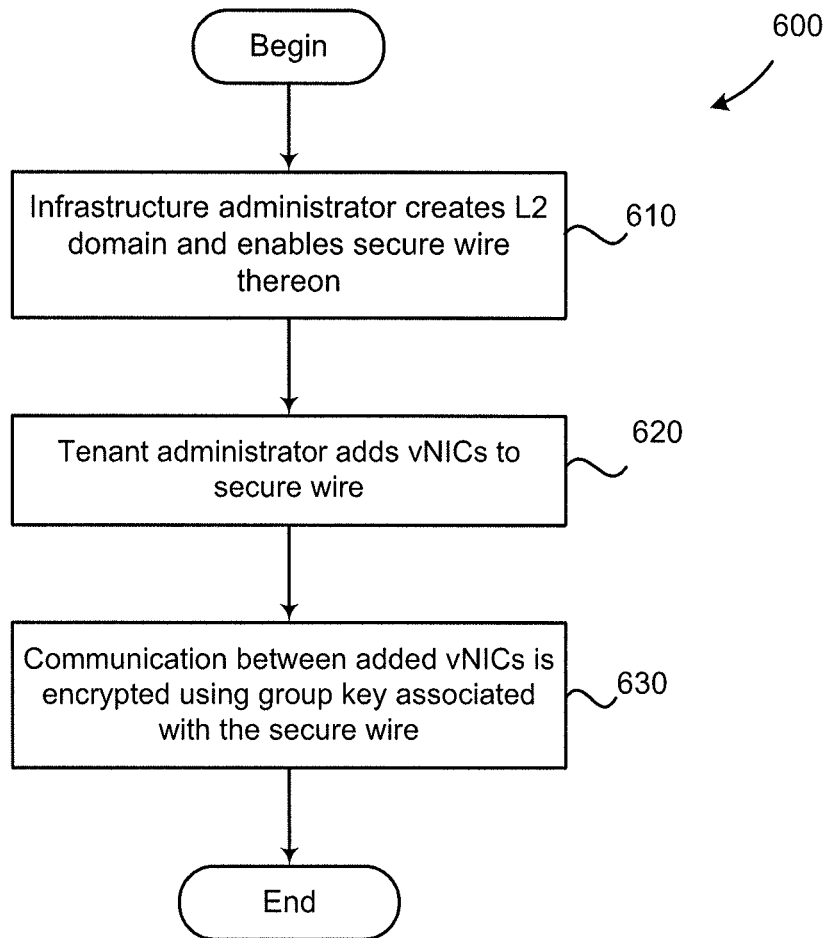
FIG. 6 illustrates a method for creating a secure wire and adding network interface cards (vNICs) to the secure wire, according to an embodiment of the invention.

FIG. 6 illustrates a method 600 for creating a secure wire and adding vNICs to the secure wire, according to an embodiment. As shown, the method 600 begins at step 610, where an infrastructure administrator creates an L2 domain and enables secure wire on the L2 domain. For example, the L2 domain and secure wire may be created on a network management platform (e.g., VMware Vshield™ Manager) which facilitates management of such domains for a multi-tenant environment (e.g., a cloud environment). The network management platform may then program an application running on a secure key management server to generate an encryption key for the secure wire. For example, a cloud infrastructure administration may create a VXLAN based virtual wire on the virtualization management platform and enable secure wire on the virtual wire. The virtualization management platform may then program an application running on the key management server to generate an encryption key for the new secure wire.

At step 620, a tenant administrator adds vNICs to the secure wire. Similar to the creation of the secure wire, discussed above, the tenant administrator may add vNICs to the secure wire on a virtualization management platform which manages such domains for a multi-tenant environment. In one embodiment, only tenant administrators are allowed to add vNICs to, or remove vNICs from, secure wires. Such an approach ensures that secure wire membership is controlled by tenants based on, for example, the need for secure communications between some of the tenants' VMs. Further, unauthorized VMs may be prevented from joining the secure wires.

At step 630, communication between vNICs on the secure wire is encrypted using the key associated with the secure wire. As discussed, a key manager application on the key management server may store secure wire encryption keys and membership information after secure wires are created and vNICs added to the secure wires, respectively. For a given secure wire, the key manager application may securely push the encryption key for the secure wire to key management modules of VM hosts which support vNICs added to the secure wire. Communication between the added vNICs may then be intercepted by encryption/decryption modules and encrypted/decrypted using the encryption key by invoking APIs exposed by the key management modules.

Although discussed above primarily with respect to multi-tenant cloud environments, techniques disclosed herein may also be used in other environments. For example, secure wires may provide protection and isolation to services running in enterprise environments. For example, secure wire may be used to isolate critical financial servers such that only finance department users have access to the isolated servers. Even if others obtain the data by trapping into the isolated network, the obtained data would be encrypted.

Although discussed above with respect to a secure wire which represents a single broadcast domain, multiple secure wires may interact via edge routers such as VMware vShield Edge®. Since the group encryption key is distinct for each secure wire, frames traversing from one secure wire to another cannot be decrypted by the latter. To solve this problem, an edge router may be configured such that one arm of the edge router belongs to a first secure wire and another arm of the edge router belongs to a second secure wire. The edge router may further decrypt frames traversing from the first secure wire to the second using the group key of the first secure wire, routed the frame, and encrypted the frame again using the group key of the second secure wire.

Advantageously, embodiments described herein secure data flowing over multi-tenant virtualized infrastructures using group key-based encryption which may be transparent to guest VMs and virtual switches. Even if malicious entities gain unauthorized access to secure wire data by means such as passive wiretapping, masquerading attacks, etc., the malicious entities will be unable to decipher the data. Further, group keying is well-suited for network encryption in virtualized and cloud environments, among others, due to group keying's elegant scalability, easy management, and ability to permit policies and keys to be controlled centrally. Group keying also eliminates the need to negotiate keys on a point-to-point basis, which may become intractable as the number of endpoints grows.

The various embodiments described herein may employ various computer-implemented operations involving data stored in computer systems. e.g., these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system. Computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs), CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that VMs present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method of providing encryption keys comprising:
   generating first and second different encryption keys for first and second secure wires;
   in response to a selection of a first machine to add to the first secure wire, associating an interface of the first machine with the first secure wire and using the first key at a first host computer on which the first machine executes in order for the first host computer to encrypt and decrypt messages exchanged between the first machine and a plurality of other machines connected to the first secure wire on at least a second host computer without the first host computer being required to negotiate any key for the first secure wire on a point-to-point basis with any other host computer including the second host computer; and
   in response to a selection of a second machine to add to the second secure wire, associating an interface of the second machine with the second secure wire and using the second key at a third host computer on which the second machine executes in order for the third host computer to encrypt and decrypt messages exchanged between the second machine and a plurality of other machines connected to the second secure wire on at least a fourth host computer without the third host computer being required to negotiate any key for the second secure wire on a point-to-point basis with any other host computer including the fourth host computer.

2. The method of claim 1, wherein each secure wire is established for a logical layer 2 (L2) network that stretches across Layer 3 (L3) boundaries.

3. The method of claim 2 further comprising receiving, for each secure wire, a selection of the logical L2 network on which the secure wire is to be enabled.

4. The method of claim 3 further comprising:
   identifying, for each secure wire, a selection of two or more virtual network interface cards (vNICs) of two or more machines to add to the secure wire;
   wherein using each encryption key comprises providing each encryption key to each host computer on which each identified vNIC for that key is defined.

5. The method of claim 1, wherein each host computer encrypts the messages for a secure wire by:
   identifying data messages sent by a machine connected to the first secure wire as the data messages are en route to a physical network interface card (pNIC) of the host computer; and
   encrypting the identified intercepted data messages before supplying the encrypted data messages to a pNIC of the host computer.

6. The method of claim 5, wherein each host computer includes with each of encrypted data message at least one of (i) a value which identifies the encryption key, (ii) an encoded encryption initialization vector value, and (iii) a signed hash value used to authenticate the encrypted data message and ensure data integrity.

7. The method of claim 5, wherein the identified data messages are encrypted according to IEEE MAC Security Standard (MACSec) frame format.

8. The method of claim 5, wherein the encrypting for each secure wire is performed based on one or more policies specifying which traffic has to be encrypted.

9. The method of claim 1, wherein
   the first and second encryption keys are generated by a management server, and
   each encryption key is securely transmitted from the management server to two or more host computers.

10. The method of claim 1, wherein the first secure wire is enabled on a virtual extensible LAN (VXLAN).

11. A non-transitory machine readable medium storing a program which when executed by at least one processing unit provides encryption keys, the program comprising sets of instructions for:
    generating first and second different encryption keys for first and second secure wires;
    in response to a selection of a first machine to add to the first secure wire, providing the first key to a first host computer on which the first machine executes in order for the first host computer to encrypt and decrypt messages exchanged between the first machine and a plurality of other machines connected to the first secure wire on at least a second host computer without the first host computer being required to negotiate any key for the first secure wire on a point-to-point basis with any other host computer including the second host computer; and
    in response to a selection of a second machine to add to the second secure wire, providing the second key to a third host computer on which the second machine executes in order for the third host computer to encrypt and decrypt messages exchanged between the second machine and a plurality of other machines connected to the second secure wire on at least a fourth host computer without the third host computer being required to negotiate any key for the second secure wire on a point-to-point basis with any other host computer including the fourth host computer.

12. The non-transitory machine readable medium of claim 11, wherein each secure wire is established for a logical layer 2 (L2) network that stretches across Layer 3 (L3) boundaries.

13. The non-transitory machine readable medium of claim 12, the program further comprises a set of instructions for receiving, for each secure wire, a selection of the logical L2 network on which the secure wire is to be enabled.

14. The non-transitory machine readable medium of claim 13, the program further comprises a set of instructions for:
identifying, for each secure wire, a selection of two or more virtual network interface cards (vNICs) of two or more machines to add to the secure wire;
wherein the set of instructions for providing each encryption key comprises a set of instructions for providing each encryption key to each host computer on which each identified vNIC for that key is defined.

15. The non-transitory machine readable medium of claim 11, wherein each host computer encrypts the messages for a secure wire, the host computer comprises sets of instructions for:
identifying data messages sent by a machine connected to the first secure wire as the data messages are en route to a physical network interface card (pNIC) of the host computer; and
encrypting the identified intercepted data messages before supplying the encrypted data messages to a pNIC of the host computer.

16. The non-transitory machine readable medium of claim 15, wherein each host computer includes with each of encrypted data message at least one of (i) a value which identifies the encryption key, (ii) an encoded encryption initialization vector value, and (iii) a signed hash value used to authenticate the encrypted data message and ensure data integrity.

17. The non-transitory machine readable medium of claim 15, wherein the identified data messages are encrypted according to IEEE MAC Security Standard (MACSec) frame format.

18. The non-transitory machine readable medium of claim 15, wherein the set of instructions for encrypting for each secure wire is performed based on one or more policies specifying which traffic has to be encrypted.

19. The non-transitory machine readable medium of claim 11, wherein
the first and second encryption keys are generated by a management server, and
each encryption key is securely transmitted from the management server to two or more host computers.

20. The non-transitory machine readable medium of claim 11, wherein the first secure wire is enabled on a virtual extensible LAN (VXLAN).

\* \* \* \* \*